(12) United States Patent
Pedersen

(10) Patent No.: US 11,401,415 B2
(45) Date of Patent: Aug. 2, 2022

(54) BIO-BASED AND BIODEGRADABLE RESIN SUITABLE FOR PRODUCTION OF COMPOSITE MATERIALS

(71) Applicant: BIO BOND IVS, Aarhus (DK)

(72) Inventor: Thomas Brorsen Pedersen, Aarhus (DK)

( * ) Notice: Subject to any disclaimer, the term of this patent is extended or adjusted under 35 U.S.C. 154(b) by 449 days.

(21) Appl. No.: 15/772,338

(22) PCT Filed: Oct. 31, 2016

(86) PCT No.: PCT/EP2016/025132
§ 371 (c)(1),
(2) Date: Apr. 30, 2018

(87) PCT Pub. No.: WO2017/071825
PCT Pub. Date: May 4, 2017

(65) Prior Publication Data
US 2018/0312686 A1    Nov. 1, 2018

(30) Foreign Application Priority Data

Nov. 1, 2015   (EP) .................................... 15020214

(51) Int. Cl.
| | |
|---|---|
| *C08L 67/04* | (2006.01) |
| *B29C 70/48* | (2006.01) |
| *C08G 63/08* | (2006.01) |
| *C08J 5/04* | (2006.01) |
| *C08K 5/3492* | (2006.01) |
| *C08K 5/5399* | (2006.01) |

(52) U.S. Cl.
CPC .............. *C08L 67/04* (2013.01); *B29C 70/48* (2013.01); *C08G 63/08* (2013.01); *C08J 5/045* (2013.01); *C08K 5/34922* (2013.01); *C08K 5/5399* (2013.01); *C08J 2367/04* (2013.01); *C08L 2201/02* (2013.01); *C08L 2201/06* (2013.01)

(58) Field of Classification Search
CPC . C08L 67/04; B29C 70/48; C08J 5/045; C08J 2367/04; C08K 5/34922; C08K 5/5399
See application file for complete search history.

(56) References Cited

U.S. PATENT DOCUMENTS

| | | | | |
|---|---|---|---|---|
| 8,604,123 | B1 * | 12/2013 | Weismann | ............... C08K 3/26 524/539 |
| 2004/0106734 | A1 * | 6/2004 | Rose | ........................ A61L 17/12 525/165 |
| 2005/0043462 | A1 * | 2/2005 | Yamada | .................. C08L 67/02 524/445 |
| 2006/0235113 | A1 * | 10/2006 | Dorgan | .................... C08J 5/045 524/13 |
| 2008/0249227 | A1 * | 10/2008 | Ueda | ....................... C08L 23/02 524/492 |

OTHER PUBLICATIONS

Compatibility of biodegradable poly (lactic acid) (PLA) and poly (butylene succinate) (PBS) blends for packaging application Arnita Bhatia1, Rahul K. Gupta1, Sati. N. Bhattacharyal and H. J. Choi2 1Rheology and Materials Processing Centre, School of Civil, Environmental (Year: 2007).*

* cited by examiner

*Primary Examiner* — Edward J Cain
(74) *Attorney, Agent, or Firm* — Cermak Nakajima & McGowan LLP; James Creighton Wray

(57) ABSTRACT

The present invention discloses a bio-based and biodegradable resin with a low viscosity and good elastic modulus and tensile strength that can be used for production of composite materials. The invention also relates to composite materials manufactured from said resin and methods for manufacturing said composite materials. The resin is comprised by at least 50% cyclic diesters or oligomers of said cyclic diesters with lactide and poly lactic acid as preferred components.

24 Claims, No Drawings

BIO-BASED AND BIODEGRADABLE RESIN SUITABLE FOR PRODUCTION OF COMPOSITE MATERIALS

CROSS-REFERENCE TO RELATED APPLICATIONS

This application claims priority under 35 U.S.C. § 119(e) to the European patent application EP15020214.1 filed 1 Nov. 2015.

BACKGROUND OF THE INVENTION

Field of the Invention

The invention relates to a bio-based and biodegradable resin that can be used for composite materials and composite materials produced herewith, suitable for production through the use in resin transfer moulding (RTM) or vacuum assisted resin transfer moulding (VARTM) processes.

Description of Related Art

In view of finding sustainable materials and environmental protection, there is a general need for materials that are based on renewable resources such as plant material and materials that can be discarded in an environmentally friendly manner. Through the last decades, the use of composite materials has grown significantly due to their high strength to weight ratio. Composite materials consist of at least two macroscopically different phases, commonly a fibrous reinforcement embedded in an organic polymer matrix. The fibrous reinforcement is commonly glass, carbon or aramid, but recently bio-based fibres such as hemp, flax, kenaf and jute have become commercially available. The polymer matrix is in most cases epoxy, polyester, vinyl ester or polyurethane, which are all based on crude oil and non-biodegradable and in most cases non-recyclable.

Due to the commercial availability of bio-based fibres, composite materials with a sustainable reinforcement can be obtained whereas most available matrix materials are unsustainable. In addition to being non-biodegradable and only partly sustainable, composite materials made from a biological fibre and an oil-based polymer matrix has the drawback of a poor compatibility between the reinforcement and matrix due to differences in polarity and chemical groups between the fibres and the matrix. The poor compatibility has a negative impact on the mechanical properties of the composite material.

One route to obtain a fully bio-based and biodegradable composite material is to utilise resins based on plant triglycerides as matrix material. An example of a triglyceride based resin is disclosed in WO9921900, where triglycerides are functionalised through chemical reactions employing oil-based products to incorporate reactive groups such as epoxy, acrylate and glycerol. The functionalisation by for instance epoxy groups can make the resin less environmentally safe as epoxy is sensitising to the human skin and it uses oil-based products. In addition, the resin based on functionalised triglycerides has elastic modulus and flexural modulus values lower than those of presently used composite matrix materials, even when the functionalised triglycerides are mixed with oil-based components.

Another option to obtain a fully bio-based and biodegradable composite material is to use poly lactic acid as matrix, which is a polymer that can be amorphous or semicrystalline. Poly lactic acid can be produced from various plant sources such as maize, beans, peas, sugarcanes and wood. Poly lactic acid has an elastic modulus of 3.2-3.4 GPa which exceeds that of commonly used epoxy, polyester and vinylester resins used as composite matrix material. Some drawbacks of poly lactic acid are a low impact resistance, low fracture toughness, high viscosity and for some applications a glass transition temperature maximum of about 65° C.

Fibre reinforced composite materials are often manufactured by means of either resin transfer moulding (RTM) or vacuum assisted resin transfer moulding (VARTM) processes. Both processes involve two basic steps: first fabrication of a fibre preform inside a mould with the shape of the finished composite material, where the preform is comprised by a plurality of fibres in most cases present as fabric layers and second impregnation of the preform with a resin. During the process, full impregnation of the fibres is essential for the performance of the final composite material.

In RTM processes, the matrix resin is injected into the mould under pressure. In the VARTM process, the resin is drawn into the mould by applying a pressure inside the mould that is lower than the pressure outside the mould. If a thermoplastic resin is used, the resin is injected or drawn into the mould at a temperature above its melting point and upon impregnation of the preform, a temperature reduction will cause the resin to solidify and constitute the matrix of the composite material. For thermosetting resins, the resin is injected or drawn into the mould at a temperature where it is in a liquid state and upon impregnation of the preform, the resin is allowed to cure through polymerisation upon which the final composite material is obtained.

EP2905297 discloses a poly lactic acid resin that can be used for injection moulding. The resin is produced in a separate container and made into pellets. The pellets are remelted and the molten resin can be injected into a preform. A disadvantage of this approach is the high melt viscosity of the poly lactic acid being around 5-40 Pa·s in the temperature range 190-200° C. due to influence of the polymer molecular weight on the melt viscosity. The high viscosity makes the resin less suitable for larger structures and structures with complex geometries as areas of unimpregnated fibres are likely to arise in the final structure.

Others inventions such as US20110190437, WO2014US57919, U.S. Pat. No. 8,378,027, WO2014115029 and US2015056880 describe the use of poly lactic acid resin, in some embodiments mixed with other resins, including oil-based resins, to manufacture composite materials. These inventions manufacture the composite through injection moulding, where the resin is often injected at temperatures between 180 and 220° C. Despite the high temperature, the viscosity of the resin at the injection temperature is at a level that complicates the production of larger composite materials. Furthermore, temperatures between 180 and 220° C. can lead to degradation of some natural fibres which limit the use of the aforementioned resins in the manufacture of fully bio-based and biodegradable composites. Further, at temperatures above 200° C., degradation of poly lactic acid initiates.

US2004/0106734 to Rose discloses a composite consisting of the two components poly glycolide fibers and lactide is disclosed. Upon mixing the poly glycolide fibers and lactide, the mixture is placed at 150° C. to polymerise the lactide.

US2006/0235113 to Dorgan et al discloses a composite consisting of the three components cellulose fibers and fibrous reinforcement and poly lactic acid and lactide. Since the matrix solely consists of poly lactic acid either used direct or created as a result of the polymerization of lactide, the resulting composite suffers from low impact resistance and limited glass transition temperature.

Therefore, at present, the reinforcement for bio-based and biodegradable composite materials exists, but the use is impeded by the lack of a suitable bio-based and biodegradable resin.

Definitions

As used herein, the term lactide refers to any of the isomeric states of L-lactide, D-lactide and meso-lactide or mixtures hereof.

As used herein, the term poly lactic acid refers to any of the isomeric states of poly (L-lactic acid), poly (D-lactic acid) and poly (L,D-lactic acid) or mixtures hereof.

BRIEF SUMMARY OF THE INVENTION

In the present invention, a bio-based and biodegradable resin with a low viscosity very suitable for production of composite materials through the use in RTM and VARTM processes is disclosed. The resin can also find application in other areas and processes with an example being adhesive and processes involving mechanical mixing and spraying. The resin can be manufactured as a two component system with the resin base and the curing agent or compound causing the resin to polymerise in separate containers or in a one component system where the resin and the curing agent or compound causing the resin to polymerise are present in the same container, mixed in the desired ratio. The resin has a low viscosity and good elastic modulus and tensile strength. The impregnation of the fibres is promoted by a low viscosity of the resin and a matching polarity between the fibres and the resin. The importance of having a resin with low viscosity increases with the size and geometric complexity of the composite material.

DETAILED DESCRIPTION OF THE INVENTION

The resin contains at least 50% by weight of lactide or other cyclic diesters such as glycolide or poly lactic acid oligomers or other oligomers that can be synthesised from the aforementioned cyclic diesters such as poly glycolic acid oligomers with an average molecular mass between 200 and 6000 g/mol or at least 50% by weight of cyclic diester and oligomers synthesised from said diesters. The cyclic diester and oligomer are preferably lactide and poly lactic acid oligomer, respectively. The lactide part of the resin is polymerised to poly lactic acid or the poly lactic acid oligomers are fully polymerised inside the mould containing the composite preform by one or more catalysts suitable for the ring-opening polymerisation of lactide and other cyclic diesters or catalysis of polymerisation of poly lactic acid. Numerous catalysts are available such as stannous octoate, zinc octoate, stannous alkoxides, aluminium isopropoxide, 4-(dimethylamino)pyridine and novozym 435 and their concentration can be varied as a larger concentration of catalyst increases the polymerisation rate, but on the contrary reduces the maximum obtainable molecular weight of the polymer. Common catalyst concentrations are 0.01 to 0.5% by weight. The resin is stored under conditions where polymerisation of lactide or poly lactic acid oligomers or any other components in the resin is absent or highly limited. Shortly prior to injection of infusion, the resin including the catalyst is brought into a liquid state, if not present in liquid state at temperatures normally found in composite production environments, and is then injected or infused into the mould containing the preform to impregnate the plurality of fibres comprising the preform. Infusion or injection of lactide monomers or poly lactic acid oligomers ensures a resin with viscosity values as low as 10 mPa·s during the impregnation process, which ensures a fast and full impregnation of the fibres, even for very large structures. After impregnation of the fibres, the resin is allowed to polymerise within the mould to yield the composite material. Thus the mechanical properties such as elastic modulus and tensile strength of the polymerised resin can reach the same levels as poly lactic acid.

The ratio between lactide and poly lactic acid oligomers in the resin can be tailored to the application. For large structures, a high lactide to poly lactic acid oligomer ratio is employed as this gives the resin a low viscosity, which leads to a fast impregnation of the preform. For smaller structures, a smaller lactide to poly lactic acid oligomer ratio is employed as this reduces the polymerisation time and therefore can provide a faster component manufacture time compared to a resin with a higher lactide to poly lactic acid oligomer ratio.

Particularly advantageous embodiments and features of the invention are given by the dependent claims, as revealed in the following description. Further embodiments may be derived by combining the features of the various embodiments described in the following, and features of the various claim categories can be combined in any appropriate manner.

In advantageous embodiments, the resin is comprised by at least 70% by weight of lactide or poly lactic acid oligomers with an average molecular mass between 200 and 6000 g/mol or at least 70% by weight of lactide and poly lactic acid oligomers due to the high elastic modulus of the poly lactic acid compared to other bio-based polymers.

In advantageous embodiments, the resin is a one component system implying that the resin contains a plurality of chemical constituents and the catalysts or curing agents necessary to polymerise the resin. A one component resin system can be produced by mixing the different chemical constituents of the resin in the liquid state and upon mixing adding the catalysts or curing agents to the mixed chemical constituents followed by another mixing of the catalysts or curing agents into the resin. Shortly after the addition of catalysts or curing agents, the liquid mixture is cooled to a temperature where either the resin or the catalysts or curing agents are unreactive, which implies that the chemical structures in the resin do not undergo or only to a very limited extent undergo polymerisation or other chemical reactions.

In various preferred embodiments, the resin composition is fully biodegradable as this environmentally advantageous. Full biodegradability can be achieved by solely employing biodegradable plant based material in the resin composition or through addition crude-oil based components capable of undergoing biodegradation such as Dupont Biomax®, BASF Ecoflex and poly (butyrate adipate terephthalate).

For various embodiments, components increasing the fracture toughness of the polymerised resin are added to the resin. Examples hereof are BASF Ecoflex, GS Pla®, poly olefins, poly hydroxyalkanoates, poly (ethylene glycole) and organo modified layered silicates such as montmorillonite.

In other embodiments, chemical compounds increasing the impact strength are included in the resin composition. Various compounds can be used to increase the impact strength of the resin and these include, but are not limited to, triacetin, poly (butylene succinate), glucose monoesters and poly ethylene.

In alternative embodiments, a resin capable of cross linking, i.e., establishing interconnecting bonds between polymer chains, is manufactured as cross linking can increase the glass transition temperature and strength of the polymerised resin. One example of a cross linking agent is a molecule with at least two amine groups and at least 3 active protons, i.e., at least 3 hydrogen atoms attached to a nitrogen atom within the entire molecule. Preferably, the cross linking agent has at least three primary amine groups as this increases the probability of cross linking and the primary amine groups are more reactive than the secondary ones. The amine groups can undergo reaction with the ester group in the poly lactic acid chain or other structures within the polymer that contain ester bonds to yield an amide. With at least 3 active hydrogen atoms in the amine molecule it can connect different polymer chains containing ester bonds and thereby establish a crosslinked structure. Other suitable cross linking agents are molecules containing at least three carboxylic acids groups. The terminal groups of poly lactic acid chains are a hydroxyl groups which can undergo reaction with a carboxylic acid group to yield a linkage of the two molecules through an ester bond under the displacement of water. Other cross linking agents are available and should be able to undergo reaction with ester bonds, hydroxyl groups or other functional groups present in the resin composition.

In another embodiment, the cross linking agent contains 2 chemical groups with a functionality to bind to a part of the poly lactic acid such as amine groups or carboxylic acid groups. In addition hereto, the binding agent contains another functional group that can bind to another cross linking agent molecule and examples of said functional group are carbon-carbon double or triple bond, epoxy or hydroxyl.

For various embodiments, the lactide part of the resin is mainly comprised by either L-lactide, D-lactide or oligomers of either poly D-lactic acid or poly L-lactic acid to obtain a polymerised resin dominated by either the poly L-lactic acid or poly D-lactic acid enantiomer. Preferably, the ratio between the said two enantiomers is 1:10 by weight, more preferably at least 1:15 by weight. Preferably, the composition is enriched in the L-enantiomer as this has better crystallisation properties than the D-enantiomer. A polymer enriched in either of the two enantiomers possesses a higher crystallisation tendency implying that at a given set of process conditions, the polymer enriched in either of the two enantiomers can reach a higher crystallisation degree than a polymer comprised by an even mixture of the two enantiomers. The higher crystallisation degree increases the heat resistance of the matrix part of the composite and therefore composites can be applied at higher temperature if the resin is enriched in either of the two enantiomers. The higher heat resistance is obtained as the melting temperature of the crystalline phase is typically around 150-170° C., whereas the glass transition temperature of the amorphous phase of the matrix is around 60° C.

In various embodiments, the resin is dyed with one or more molecules as this enables tailoring of the colour of the polymerised to a specific application. A broad selection of commercial dyes is available including the following tradenames: Dorospers, Cibacet, Foron and C. I. Disperse.

In various embodiments of the invention, the resin contains one or more flame regarding molecules or compounds to increase the fire safety of the resin. Examples of flame retarders suitable for poly lactic acid include spirocyclic pentaerythritol bisphosphorate disphosphoryl melamine, organomodified silicates, triazine phosphamide, ethyl phosphorodichloridate, aryl polyphenylphosphonates, spirocyclic pentaerythritol bisphosphorate disphosphoryl melamine.

In other embodiments, the ratio between the two enantiomers of poly lactic acid and the process conditions are controlled as to minimise or maximise the crystallisation degree as the biodegradation rate depends on the crystallisation degree of the poly lactic acid part of the polymerised resin. As the crystalline phase exhibits a slower biodegradation than the amorphous phase, polymerised resin with a high crystallisation degree will have a slow biodegradation, whereas polymerised resin with a large amorphous part will exhibit a fast biodegradation. Suitable enantiomer ratios for obtaining a high amorphous to crystalline ratio in the matrix are between 1:1 and 1:4.

For advantageous embodiments, the preform layup consists of the fibres required for the reinforcement of the composite material and bio-based polymers such as poly hydroxyalkanoates, poly lactic acid and poly glycolic acid, with poly lactic acid being preferred, that can be present in various forms such as randomly oriented fibres, mats, layers, films, powder, pellets and coating on other fibres. Said bio-based polymers can contain dyes and flame retarders. After impregnation of the preform with the resin, the biopolymer dissolves into the injected or infused resin and establishes chemical bonds hereto. By means hereof, the resin and the biopolymer in the preform polymerise together. This approach is advantageous as fibres can be impregnated with a low viscosity resin and the already polymerised polymer inside the preform ensures a short polymerisation time and good mechanical properties of the composite matrix.

For preferred embodiments, the preform layup consists of the fibres required for the reinforcement of the composite material and poly lactic acid fibres or powder. The poly lactic acid fibres can be present as randomly oriented fibres or fibres present in a continuous piece of material containing a plurality of fibres, which is commonly called a fabric and can be woven or non-woven. In these embodiments, the temperature during the impregnation of the fibres and polymerisation of the resin is below the melting temperature of the poly lactic acid fibres, which implies that the temperature in most cases should not exceed about 150° C. Preferably, the poly lactic acid fibres have a crystallinity of 15-100%, more preferably 25-90%. The poly lactic acid fibres increase the fracture toughness of the final composite material as they are embedded in the composite matrix and have excellent compatibility with the matrix.

In various embodiments, the resin is in liquid state mixed with natural fibres such as wood, shredded wood, hemp, flax, jute, kenaf, coconut, bamboo, sphagnum and hay and potentially poly lactic acid fibres or powder in a container and following impregnation of the fibres the structure comprising the impregnated fibres and any excess resin is shaped into a desired dimension. Upon shaping, the resin is polymerised to yield a cohesive structure where the fibres are held together by the resin through chemical bonds. Said various embodiments can for instance be used to manufacture biodegradable chip boards.

For various embodiments, the resin is in liquid state spayed or poured onto natural fibres such as wood, shredded wood, hemp, flax, jute, kenaf, coconut, bamboo, sphagnum and hay and potentially poly lactic acid fibres or powder to impregnate the fibres. Upon impregnation, the fibres and any excess resin are shaped into a desired dimension followed by polymerisation of the resin to yield a cohesive structure where the fibres are held together by the resin through chemical bonds. Said various embodiments can for instance be used to manufacture biodegradable chip boards.

The invention claimed is:

1. A resin containing at least 50% by weight of one of the following
   a. cyclic diesters
   b. poly lactic acid oligomers or other oligomers, with an average molecular mass between 200 and 6000 g/mol, and capable of being synthesised from cyclic diesters
   c. cyclic diesters and oligomers synthesized from the said diesters and at least the following:
   d. at least one chemical compound increasing the impact strength is included in the resin composition.

2. A resin according to claim 1, where the cyclic diester and oligomer is lactide and poly lactic acid oligomer, respectively.

3. A resin according to claim 1, where the at least one chemical compound increasing the impact strength is selected from the following chemical compounds: triacetin, poly (butylene succinate), glucose monoesters and poly ethylene.

4. The resin according to claim 2, in which the weight of lactide and poly lactic acid oligomers, with an average molecular mass between 200 and 6000 g/mol, comprise at least 70% of the resin weight.

5. The resin according to claim 1, containing at least one flame regarding molecules or compounds to increase the fire safety of the resin.

6. The resin according to claim 1, containing at least one flame retarding molecules from the group: spirocyclic pentaerythritol bisphosphorate disphosphoryl melamine, organomodified silicates, triazine phosphamide, ethyl phosphorodichloridate, aryl polyphenylphosphonates, spirocyclic pentaerythritol bisphosphorate disphosphoryl melamine.

7. The resin according to claim 2, where the lactide part of the resin is comprised by at least 90% by weight of L-lactide and L-poly lactic acid oligomers.

8. The resin according to claim 2, where an enantiomeric ratio between lactide and poly lactic acid oligomers is between 1:1 and 1:4 by weight.

9. A composite material with a resin, said resin containing at least 50% by weight of one of the following components: lactide or other cyclic diesters; poly lactic acid oligomers or other oligomers, with an average molecular mass between 200 and 6000 g/mol, and capable of being synthesised from cyclic diesters; cyclic diester and oligomers synthesised from the said diesters; and at least one of the following components: at least one chemical compound increasing the impact strength is included in the resin composition; or at least one cross linking agent that contains at least two chemical groups capable of establishing a chemical bond to poly lactic acid such as amine groups and carboxylic acid groups, wherein the composite material is produced by injecting or infusing the resin into a mould containing a preform with a plurality of fibres serving as reinforcement in the composite material, and wherein the resin is polymerised after impregnation of the fibres.

10. A composite material according to claim 9, where the at least one chemical compound increasing the impact strength is selected from the following chemical compounds: triacetin, poly (butylene succinate), glucose monoesters and poly ethylene.

11. A composite material according to claim 9, wherein the resin is injected or infused into a mould containing a preform containing a fibrous reinforcement and bio-based polymers.

12. A composite material according to claim 9 wherein the resin is injected or infused into a mould containing a preform with a plurality of fibres serving as reinforcement in the composite material and in addition hereto the preform contains poly lactic acid fibres or powder and after impregnation of the fibres, the resin is polymerised.

13. A composite material according to claim 9, where the resin in liquid state is mixed with or sprayed or poured onto at least one fibrous material.

14. A resin containing at least 50% by weight of one of the following
    a. cyclic diesters
    b. poly lactic acid oligomers or other oligomers, with an average molecular mass between 200 and 6000 g/mol, and capable of being synthesised from cyclic diesters
    c. cyclic diesters and oligomers synthesized from the said diesters
    and at least the following:
        at least one cross linking agent that contains at least two chemical groups capable of establishing a chemical bond to poly lactic acid.

15. A resin according to claim 14, where the cyclic diester and oligomer is lactide and poly lactic acid oligomer, respectively.

16. A resin according to claim 14, where the cross linking agent contains at least one amine or carboxylic acid group.

17. The resin according to claim 15, in which the weight of lactide and poly lactic acid oligomers, with an average molecular mass between 200 and 6000 g/mol, comprise at least 70% of the resin weight.

18. The resin according to claim 14, wherein the resin contains at least one compound to improve its fracture toughness.

19. The resin according to claim 14, containing at least one flame regarding molecules or compounds to increase the fire safety of the resin.

20. The resin according to claim 15, where an enantiomeric ratio between lactide and poly lactic acid oligomers is between 1:1 and 1:4 by weight.

21. A composite material with a resin, said resin containing at least 50% by weight of one of the following components: lactide or other cyclic diesters; poly lactic acid oligomers or other oligomers, with an average molecular mass between 200 and 6000 g/mol, and capable of being synthesised from cyclic diesters; cyclic diester and oligomers synthesised from the said diesters; and at least one cross linking agent that contains at least two chemical groups capable of establishing a chemical bond to poly lactic acid such as amine groups and carboxylic acid groups, wherein the composite material is produced by injecting or infusing the resin into a mould containing a preform with a plurality of fibres serving as reinforcement in the composite material, and wherein the resin is polymerised after impregnation of the fibres.

22. A composite material according to claim 21, wherein the resin is injected or infused into a mould containing a preform containing a fibrous reinforcement and bio-based polymers.

23. A composite material according to claim 21 wherein the resin is injected or infused into a mould containing a preform with a plurality of fibres serving as reinforcement in the composite material and in addition hereto the preform contains poly lactic acid fibres or powder and after impregnation of the fibres, the resin is polymerised.

24. A composite material according to claim 21, where the resin in liquid state is mixed with or sprayed or poured onto at least one fibrous material.

\* \* \* \* \*